United States Patent

[11] 3,576,571

[72] Inventor Robert K. Booher
Mission Viejo, Calif.

[21] Appl. No. 789,442
[22] Filed Jan. 7, 1969
[45] Patented Apr. 27, 1971
[73] Assignee North American Rockwell Corporation

[54] MEMORY CIRCUIT USING STORAGE CAPACITANCE AND FIELD EFFECT DEVICES

9 Claims, 3 Drawing Figs.

[52] U.S. Cl. .......... 340/173R, 307/279

[51] Int. Cl. .......... G11c 11/24, G11c 11/40

[50] Field of Search .......... 340/173; 307/173, 279

[56] References Cited

UNITED STATES PATENTS

| | | | |
|---|---|---|---|
| 2,741,756 | 4/1956 | Stocker .......... | 340/173 |
| 2,840,799 | 6/1958 | Holt .......... | 340/173X |
| 3,111,649 | 11/1963 | Carroll .......... | 340/173 |

*Primary Examiner*—Terrell W. Fears
*Assistant Examiner*—Stuart Hecker
*Attorneys*—Robert G. Rogers, William R. Lane and L. Lee Humphries

ABSTRACT: The memory circuit includes a first capacitor that is charged through an address matrix to a potential representing a logical state during the write period of a memory cycle, and a second capacitor which is conditionally charged as a function of that logical state.

The second capacitor conditionally provides charge to the first capacitor periodically to maintain the logical state of the first capacitor until it is altered during a subsequent write period.

A MOS device is responsive to the charge on the first capacitor for driving an output terminal connected to one of its electrodes to a potential representing the logical state. The second capacitor has an electrode connected through a MOS switching device to the ungrounded side of the first capacitor for increasing the potential on the first capacitor and thereby increasing the potential to which the output terminal is driven.

INVENTOR.
ROBERT K. BOOHER
BY Robert G. Rogers
ATTORNEY

INVENTOR.
ROBERT K. BOOHER

BY Robert G. Rogers
ATTORNEY

MEMORY CIRCUIT USING STORAGE CAPACITANCE AND FIELD EFFECT DEVICES

BACKGROUND OF THE INVENTION

1. Field of the Invention

The invention relates to a memory circuit and more particularly to such a circuit in which field effect devices are combined in a ratioless manner for reducing power requirements and for permitting the use of small geometry devices.

2. Description of Prior Art

It would be advantageous to be able to use either P or N channel MOS devices in producing a low power, ratioless MOS memory circuit. When MOS devices are operated as resistors, in a ratio embodiment, power is necessarily consumed. In addition, devices having relatively different resistances must be used in order to produce a voltage level which represents different logical states.

It would be preferable to use devices having the same geometry, that is, the same physical size. However, in order to do that, some means must be used to produce voltage levels representing logic levels without the requirement of voltage divider action.

Although capacitors can be easily produced and used as storage elements in conjunction with MOS storage circuits, in order to provide a system which has the greatest utility, the circuit should have a nondestructive readout capability. Otherwise, after every read period, additional power would be required to restore a logical state, for example, by charging or discharging the capacitor.

In addition, inherent capacitance connected with the electrodes of the MOS devices lose charge by leakage. Therefore, some means must be provided for maintaining the charge representing a logical state until the charge is changed to indicate a different logical state.

The present invention provides a MOS memory circuit in which MOS devices are used in a ratioless manner and in which capacitors are used to provide nondestructive readout of stored logical information.

SUMMARY OF THE INVENTION

Briefly, the memory system comprises a memory circuit including means for conditionally charging a capacitance during a first interval and means responsive to the same condition for changing the voltage level of said capacitance during a subsequent interval. The means responsive is connected to be responsive to said changed voltage level.

In one embodiment, the invention includes means for charging a first capacitor through an address matrix to a first discrete voltage, or potential, representing a logical state during a first interval. The capacitor has one electrode connected to ground. The other electrode is connected to the control electrode of a first MOS device which is responsive to the charge on the capacitor. The first MOS device has an input electrode connected to a clock source and is used to read the stored logical state of the first capacitor.

A second capacitor, conditionally charged as a function of said logical state, has one electrode connected to the output electrode of the first MOS device and a second electrode connected through a second MOS device to the ungrounded side of the capacitor for feeding back changes in voltage on the output electrode of the first MOS device for increasing the drive on the control electrode of the first MOS device to a second discrete voltage level during a subsequent interval. As a result of being able to increase the drive voltage on the control electrode of the first MOS device, when the logical state is true, the first MOS device can be driven so that the voltage appearing on its output electrode overcomes the threshold loss of the first MOS device. Although the first capacitor is described as having an electrode connected to ground, it should be understood that the electrode could be connected to any suitable voltage potential.

Any charge which had been lost from the first capacitor, due to leakage, is replaced by the charge which is injected during the feedback phase. The circuit also includes another MOS switching device which turns on during a memory read/write cycle for resetting the distributed capacitance of the lines and the MOS devices of the address matrix of a system to ground to prevent erroneous readouts from occuring.

Therefore, it is an object of this invention to provide a MOS memory circuit comprising MOS devices operated in a ratioless manner.

It is still a further object of this invention to provide a MOS memory circuit in which MOS devices having similar geometry are used in combination with capacitors for providing a dynamic storage circuit having reduced power consumption.

It is still a further object of the invention to provide a storage circuit using one capacitor for storing a potential representing a logical state and a second capacitor for restoring and/or increasing the charge on the first capacitor to permit nondestructive readout of the stored information.

A still further object of the invention is to provide a plurality of MOS storage circuits interconnected through an address matrix wherein each device includes the capability for conditionally resetting the lines and devices of the matrix to ground after every write period of a read/write memory cycle.

Still a further object of the invention is to provide a nondestructive MOS memory circuit for storing a logical state on a first capacitor which is also used to control the output from a MOS device representing the logical state.

These and other objects of the invention will become more apparent in connection with the description of the drawings, a brief description of which follows:

DESCRIPTION OF THE PREFERRED EMBODIMENT

Figure 1:
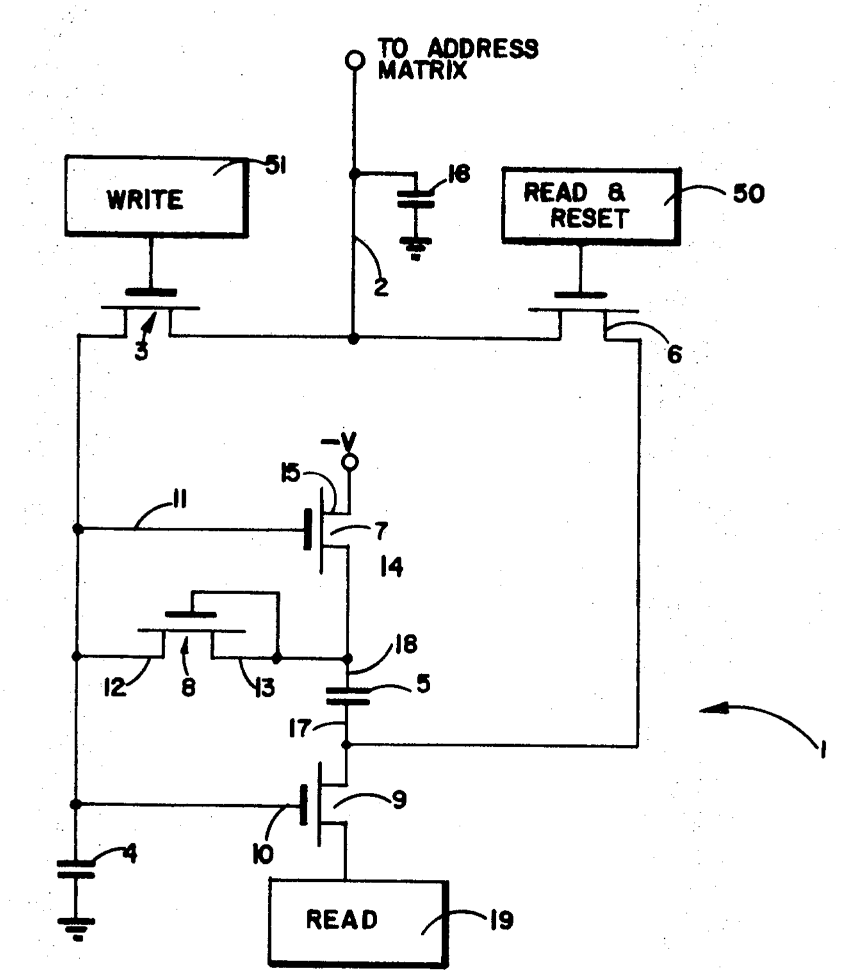
FIG. 1 illustrates on embodiment of a MOS memory circuit usable in a memory system.

FIG. 1 illustrates a preferred embodiment of single MOS memory circuit 1 comprising common input/output line 2 of an address matrix (not shown) connected through write control MOS device 3 to one electrode of capacitor 4. The other electrode of the capacitor is connected to ground. The electrode could also be connected to a bias potential for certain applications. The ground potential is intended to illustrate one possibility. The common input/output line 2 is also connected to electrode 17 of capacitor 5 through read/reset control device 6. Electrode 18 of capacitor 5 is connected through MOS device 7 to voltage source $-v$ and through MOS device 8 to the ungrounded electrode of capacitor 4. MOS device 9 is connected between electrode 17 of capacitor 5 and the clock signal source 19. Read/reset clock source 50 and write clock source 51 are connected to the control electrodes of MOS devices 6 and 3 respectively.

Gate electrode 10 of MOS device 9 is connected to the ungrounded electrode of capacitor 4, to gate electrode 11 of MOS device 7 and to source electrode 12 of MOS device 8. Since the gate electrode 10 and gate electrode 11 are connected to the ungrounded electrode of capacitor 4, the devices are responsive to the charge on the capacitor as will be described subsequently.

The gate electrode of MOS device 8 and its drain electrode 13 are connected to electrode 18 of effective or discrete capacitor 5 and to source electrode 14 of MOS device 7. Drain electrode 15 of MOS device 7 is connected to the voltage source $-v$.

Logical information is stored in the memory circuit when addressed through the address matrix by effective or discrete capacitor 4 to a discrete voltage level, or potential, representing either a logical 1 or a logical 0. For purposes of this description, a logical 1 is represented by a negative potential and a logical 0 is represented by a ground potential. A voltage representing the stored information is read out from the circuit from electrode 17 of capacitor 5 through MOS device 6 during the read period of the cycle. The information could also be read out from electrode 18 of the capacitor 5.

Figure 2:
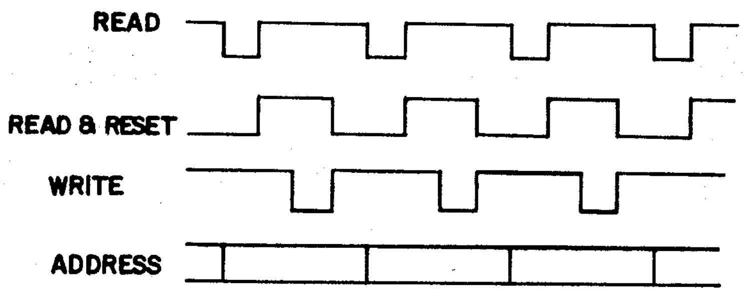
FIG. 2 illustrates the control signals usable by the circuits during a read/write memory cycle.

During a write cycle, the write clock signal from source 51 becomes negative as shown in FIG. 2 and write device 3 is turned on. Assuming that circuit 1 is addressed through the address matrix, shown in more detail in FIG. 3, if capacitor 4 is charged to a ground potential as when a logical 0 is being stored, MOS devices 7 and 9 are off. Thereafter, when the read signal from source 19 becomes true, or negative as shown in FIG. 2, MOS device 9 remains off and the charge on the capacitors remains the same. Similarly, during the reset period between the write and read periods, MOS device 6 is turned on by the read/reset clock signal from source 50 and the input/output line 2 remains at ground. Since it had already been set to a ground level during the write period for the assumed example, the charge on capacitor 16 would not be changed.

Figure 3:
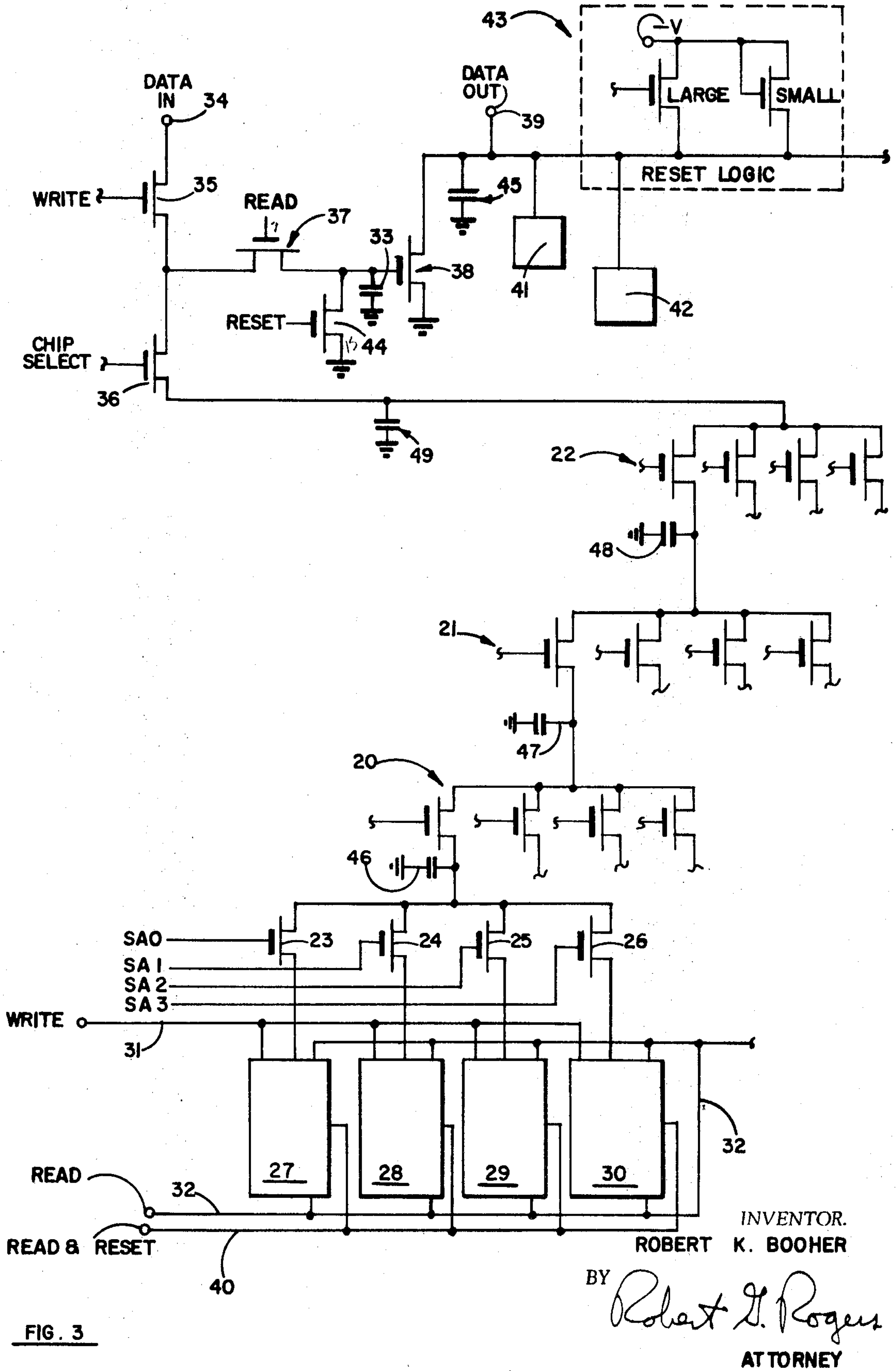
FIG. 3 illustrates an embodiment of a memory system using the FIG. 1 memory circuit.

It should be understood that capacitor 16 is a representation of the inherent capacitance associated with input/output line 2. Ordinarily the capacitor 16 would be the distributed inherent electrode capacitances of the devices along the common input/output line of the address matrix of the memory system as shown in FIG. 3. It is illustrated as a single capacitor in FIG. 1 for convenience only.

The capacitor 4 may be charged negatively during the write period of the memory cycle to a voltage of, for example, −10 volts when a logical 1 is written into memory circuit 1 and when it is addressed. In that case, during the reset period which follows, the read signal from source 19 is at ground level and electrode 17 of capacitor 5 is connected through device 9 to ground. MOS device 6 is turned on during the reset period for effectively discharging capacitor 16 to ground so that the common input/output line 2 is neutralized. If the line had not been neutralized, as will be seen more clearly in connection with FIG. 3, the stored charge on capacitor 16 could have caused the occurrence of reading errors when other memory circuits of a system are addressed.

If it is assumed that $-v$ is equal to 10 volts and that each of the MOS devices has a 3 volt threshold drop, the negative charge on capacitor 4 would turn device 7 on and capacitor 5 would be charged to approximately −7 volts through MOS device 7. Thereafter, when the read signal from source 19 becomes true, MOS device 9, which was turned on during the reset cycle, remains on so that its output electrode is driven to approximately −7 volts. The 7 volt change appears instantaneously on electrode 18 of capacitor 5 so that the potential on electrode 18 is changed from approximately −7 volts to approximately −14 volts. As a result, MOS device 8 is turned on and additional current is permitted flow through MOS device 8 into capacitor 4 for increasing its charge by the amount of the voltage appearing on the electrode 18 of capacitor 5 minus the threshold drop through MOS device 8.

As the charge increases on capacitor 4, the drive voltage for MOS device 9 increases so that the voltage on its output electrode is also increased. That increase in voltage instantaneously increases the voltage on electrode 18 on capacitor 5 so that additional current flows through MOS device 8 into capacitor 4 for further increasing the drive on MOS device 9. The cycle is repeated until the leakage from capacitor 4 during a read/write cycle is equal to the increases which occur during the read period of the cycle or until the maximum clock read signal from source 19 appears on electrode 17 of the capacitor 5.

As should be obvious from the foregoing description, the output voltage on common input/output line 2 does not depend upon the resistance ratio between MOS devices. Similarly, use of a second capacitor 5 between storage capacitor 4 and MOS device 9, permits leakage current to be supplied to the capacitor 4 so that the circuit can store a logical state for an indefinite period. Since the capacitor 4 is not discharged each time the information is read out, the circuit provides a nondestructive readout capability and also reduces the power consumption which would be required if the capacitor were to be discharged during each readout period.

FIG. 3 shows an embodiment of an addressable memory system comprised of circuits similar to the circuits shown as memory circuit 1 in FIG. 1. MOS devices between the memory and the input/output terminals of the system permit the memory circuits to be addressed. A single MOS circuit, for example, may store a single logical bit of a computer word. For convenience, only four bit positions of the computer were illustrated. It should be understood that a plurality of such circuits would be used depending upon the requirements of a particular memory system.

Address control lines of the MOS devices designated generally by numerals 20, 21 and 22 of the system have been excluded for convenience. Address lines SA0 through SA3 have been shown to MOS devices 23, 24, 25 and 26 for selecting one of the memory circuits designated by numerals 27, 28, 29 and 30 for the system embodiment shown. Write line 31 and read line 32 from a write clock source and a read clock source respectively are shown connected to the memory circuits. Read/reset line 40 from a read/reset clock source is also shown. The inherent capacitance shown as capacitor 16 in FIG. 1 is shown as distributed capacitors 46 thru 49 in FIG. 3.

Similar capacitances are inherently present as part of the conductors and electrodes of the devices connected as part of the address matrix between the memory circuits and the input and output terminals of the system. If the inherent capacitance is not reset to ground as described in connection with FIG. 1 after each write period, the charge may be erroneously read out as a logic 1 (assuming a logic 1 was stored during a write period), during the read period of an addressed memory circuit in which a logic 0 had been stored.

Data is read in from the Data In terminal 34 through write control MOS device 35 through chip selection MOS device 36, and through the appropriate MOS devices forming the address matrix to the particular memory circuit being addressed.

The stored bit of information is read out through the common input/output line to Data Output terminal 39 through the read MOS device 37 and nodable MOS output device 38.

When a logic 1 is read from a memory circuit, capacitor 33 is charged negative and must be reset to ground before the next read cycle. Therefore, during the reset period of the read/write cycle, MOS device 44 is turned on to connect the capacitor 33 to ground. A reset clock signal is applied to the control electrode of MOS device 44 to turn the device on.

At the same time, reset logic 43 is turned on to connect capacitor 45 at the output to voltage source $-v$ for charging the capacitor 45 to the $-v$ level minus the threshold drop to the MOS devices comprising reset logic 43. When MOS device 38 is turned on as when a logic 1 is being read out from an addressed circuit, capacitor 45 is discharged to ground.

It should also be understood that a plurality of such memory systems as are shown in schematic form in FIG. 3 might be included in a practical embodiment such as a MOS general purpose computer. The systems may be included on several chips so that by addressing a selected chip MOS device, information may be written into and read from a memory element on the selected chip. The additional chip memories are illustrated by blocks 41 and 42.

It should be understood that although MOS switching devices have been illustrated and described, other switching devices such as MNS devices, MNOS devices and other enhancement mode field effect devices can also be used.

Although the invention has been described and illustrated in detail, it is to be understood that the same is by way of illustration and example only, and is not to be taken by way of limitation; the spirit and scope of this invention being limited only by the terms of the appended claims.

I claim:

1. In combination:

a storage capacitance, first means including field effect transistor means for charging said capacitance during a first interval to discrete voltage levels representing logic states as a function of logic states of information to be stored by said storage capacitance, second means including field effect transistor means responsive to a discrete voltage level representing one logic state for changing the voltage level of said capacitance during s subsequent interval, said second means connected to be responsive to said changed voltage level.

2. The combination recited in claim 1 wherein said second means for changing the voltage level comprises a digital circuit for connecting discrete voltage levels to said capacitance.

3. In combination:

first field effect transistor means for charging a storage capacitance during a first interval to a voltage level as a function of logic information to be stored by said storage capacitance, second means including field effect transistor means responsive to one voltage level stored by said capacitance for changing the voltage level of said capacitance during s subsequent interval to a second discrete voltage level, an output connected to said second means responsive, and said second means connected to be responsive to said changed voltage level for providing an increased voltage level on said output.

4. A memory circuit having a read/write memory cycle comprising means for charging a first capacitor to a potential representing a logical state, a second capacitor having one electrode connected to said first capacitor for increasing the charge on said first capacitor, switch means connected between said first capacitor and said one electrode of said second capacitor, said switch means becoming conductive as a function of the difference in the potentials on said first and second capacitors for connecting said second capacitor to said first capacitor, said second capacitor increasing the potential on said first capacitor when said switch means is conductive as a function of a change in the voltage potential on the other electrode of said second capacitor, field effect transistor means responsive to a potential on the first capacitor representing one logical state for changing the potential on the other electrode of the second capacitor and for indicating said logical state during said read/write memory cycle.

5. The combination recited in claim 4 wherein said first capacitor has one electrode connected to ground and an ungrounded electrode connected to said one electrode on said second capacitor through said switch means.

6. The combination recited in claim 5 including read signal source means connected to said field effect transistor means responsive, and wherein said field effect transistor means responsive comprises a first field effect transistor having one electrode connected to said read signal source means and a second electrode connected to said other electrode of said second capacitor, said first field effect transistor having a control electrode connected to the ungrounded electrode of said first capacitor for driving the second electrode of the first field effect transistor to a voltage level from said read signal source means as a function of the voltage potential on said first capacitor, said voltage level representing the logical state of the voltage potential on said first capacitor.

7. The combination recited in claim 6 where herein said field effect transistor means responsive further includes a second field effect transistor connected between a voltage source and the other electrode of said second capacitor including a control electrode connected to the ungrounded side of said first capacitor for turning said second field effect transistor on as a function of the potential on the first capacitor for charging the second capacitor.

8. The combination recited in claim 7 wherein said switch means comprises a third field effect transistor having a control and one electrode connected to said second field effect transistor and said second capacitor the other electrode of said third field effect transistor being connected to the ungrounded side of said first capacitor for turning on when the potential on said second capacitor is in excess of the potential of the first capacitor by an amount required to turn on the third field effect transistor for increasing the charge on the first capacitor during each read/write cycle of the memory circuit.

9. The combination recited in claim 8 including a plurality of said memory circuits connected to input and output terminals of a memory system through an address matrix comprising conductors and MOS devices having inherent capacitances, and wherein each memory circuit includes a MOS device connected between an output terminal of the memory circuit and said other electrode of said second capacitor for discharging at least a portion of said inherent capacitance to the voltage potential on the other electrode of said second capacitor during a reset period between the read and write periods of a memory cycle.